United States Patent
Swinnen et al.

(10) Patent No.: US 7,404,906 B2
(45) Date of Patent: Jul. 29, 2008

(54) DEVICE AND PROCESS FOR TREATING CUTTING FLUIDS USING ULTRASOUND

(75) Inventors: Mario Swinnen, Paal (BE); Eric D. Cordemans de Meulenaer, Wezembeek-Oppem (BE); Baudouin O. Hannecart, LaRoche-en-Ardenne (BE); Edward S. Beardwood, Ontario (CA)

(73) Assignee: Ashland Licensing & Intellectual Property LLC, Dublin, OH (US)

( * ) Notice: Subject to any disclaimer, the term of this patent is extended or adjusted under 35 U.S.C. 154(b) by 58 days.

(21) Appl. No.: 11/371,819

(22) Filed: Mar. 9, 2006

(65) Prior Publication Data

US 2006/0144801 A1    Jul. 6, 2006

Related U.S. Application Data

(63) Continuation of application No. 10/734,103, filed on Dec. 10, 2003, now Pat. No. 7,048,863.

(60) Provisional application No. 60/485,888, filed on Jul. 8, 2003.

(51) Int. Cl.
*C02F 1/36* (2006.01)

(52) U.S. Cl. .......................... 210/748; 210/220; 422/20; 422/128

(58) Field of Classification Search .................. 210/542, 210/748, 758, 220; 422/20, 128; 451/53, 451/449

See application file for complete search history.

(56) References Cited

U.S. PATENT DOCUMENTS

| | | | |
|---|---|---|---|
| 2,163,649 A | 6/1939 | Weaver | |
| 2,717,874 A | 9/1955 | Verain | |
| 3,634,243 A | 1/1972 | Wessels et al. | |
| 3,672,823 A | 6/1972 | Boucher | |
| 4,003,832 A | 1/1977 | Henderson et al. | |
| 4,076,617 A | 2/1978 | Bybel et al. | |
| 4,144,722 A | 3/1979 | Mattwell | |
| 4,211,744 A | 7/1980 | Boucher | |
| 4,294,853 A | 10/1981 | Williams et al. | |
| 4,514,149 A | 4/1985 | Kanebako et al. | |
| 4,602,184 A | 7/1986 | Meitzler | |
| 4,605,507 A | 8/1986 | Windgassen et al. | |
| 4,820,260 A | 4/1989 | Hayden | |
| 4,879,045 A | 11/1989 | Eggerichs | |

(Continued)

FOREIGN PATENT DOCUMENTS

DE    44 07 564    9/1995

(Continued)

OTHER PUBLICATIONS

Böm et al. "Viability of plant cell suspensions exposed to homogeneous ultrasonic fields of different energy density and wave type," Ultrasonics, vol. 38, pp. 629-632 (2000).

(Continued)

*Primary Examiner*—Robert A Hopkins
(74) *Attorney, Agent, or Firm*—Knobbe Martens Olson & Bear LLP

(57) ABSTRACT

Devices and methods for treating, preventing from growth, and neutralizing microorganisms in cutting fluids using high-frequency, low-energy ultrasound.

22 Claims, 2 Drawing Sheets

U.S. PATENT DOCUMENTS

| | | | |
|---|---|---|---|
| 4,961,860 A | 10/1990 | Masri | |
| 4,971,991 A | 11/1990 | Umemura et al. | |
| 4,975,109 A | 12/1990 | Friedman, Jr. et al. | |
| 5,130,031 A | 7/1992 | Johnston | |
| 5,130,032 A | 7/1992 | Sartori | |
| 5,145,981 A | 9/1992 | Willingham | |
| 5,198,122 A | 3/1993 | Koszalka et al. | |
| 5,215,680 A | 6/1993 | D'Arrigo | |
| 5,224,051 A | 6/1993 | Johnson | |
| 5,256,182 A | 10/1993 | Friedman, Jr. et al. | |
| 5,380,411 A | 1/1995 | Schlief | |
| 5,401,237 A | 3/1995 | Tachibana et al. | |
| 5,416,210 A | 5/1995 | Sherba et al. | |
| 5,534,172 A | 7/1996 | Perry et al. | |
| 5,558,092 A | 9/1996 | Unger et al. | |
| 5,593,596 A | 1/1997 | Bratten | |
| 5,611,993 A | 3/1997 | Babaev | |
| 5,616,544 A | 4/1997 | Kalota et al. | |
| 5,632,886 A * | 5/1997 | Staniec | 210/151 |
| 5,827,204 A | 10/1998 | Grandia et al. | |
| 5,997,812 A * | 12/1999 | Burnham et al. | 422/24 |
| 6,068,857 A | 5/2000 | Weitschies et al. | |
| 6,077,431 A | 6/2000 | Kawanishi et al. | |
| RE36,939 E | 10/2000 | Tachibana et al. | |
| 6,221,814 B1 | 4/2001 | Kaburagi et al. | |
| 6,242,391 B1 | 6/2001 | Fukutani et al. | |
| 6,258,759 B1 | 7/2001 | Futahashi et al. | |
| 6,308,714 B1 | 10/2001 | Peterson et al. | |
| 6,309,355 B1 | 10/2001 | Cain et al. | |
| 6,322,749 B1 | 11/2001 | McCarthy et al. | |
| 6,342,522 B1 | 1/2002 | Mason et al. | |
| 6,413,216 B1 | 7/2002 | Cain et al. | |
| 6,428,532 B1 | 8/2002 | Doukas et al. | |
| 6,447,720 B1 | 9/2002 | Horton et al. | |
| 6,450,738 B1 | 9/2002 | Ripley | |
| 6,518,225 B1 | 2/2003 | Fukutani et al. | |
| 6,540,922 B1 | 4/2003 | Cordemans et al. | |
| 6,656,436 B1 | 12/2003 | Sentagnes et al. | |
| 6,736,979 B2 | 5/2004 | Cordemans et al. | |
| 6,770,248 B2 | 8/2004 | Haggett et al. | |
| 2001/0002251 A1 | 5/2001 | Woodburn et al. | |
| 2002/0111569 A1 | 8/2002 | Rosenschein et al. | |
| 2003/0132165 A1 | 7/2003 | de Meulenaer et al. | |
| 2003/0136824 A1 * | 7/2003 | Simon | 232/31 |

FOREIGN PATENT DOCUMENTS

| | | |
|---|---|---|
| DE | 44 30 587 | 2/1996 |
| DE | 19700164 | 7/1998 |
| EP | 0 577 871 | 1/1994 |
| EP | 0 619 104 | 10/1994 |
| EP | 0 633 049 | 9/1995 |
| EP | 0 680 779 | 11/1995 |
| EP | 0 515 346 | 2/1996 |
| EP | 0 661 090 | 6/1998 |
| EP | 0936187 | 8/1999 |
| EP | 1008556 | 6/2000 |
| GB | 1389291 | 4/1975 |
| JP | 5-8128113 | 7/1983 |
| JP | 5-228480 | 9/1993 |
| JP | 5-228481 | 9/1993 |
| JP | 5-228496 | 9/1993 |
| JP | 5-345192 | 12/1993 |
| JP | 7-155756 | 6/1995 |
| WO | WO 80/00226 | 2/1980 |
| WO | WO 93/13674 | 7/1993 |
| WO | WO 98/01394 | 1/1998 |
| WO | WO 00/02821 | 1/2000 |
| WO | WO 2004/041314 | 5/2004 |
| WO | WO 2005/005322 | 1/2005 |

OTHER PUBLICATIONS

Hua I et al., "Optimization of Ultrasonic Irradiation as an Advanced Oxidation Technology," Environ. Sci. Technol. vol. 31, No. 8, pp. 2237-2243, Aug. 1997.

Marmor, et al., "Tumor eradication and cell survival after localized hyperthermia induced by ultrasound," Cancer Research, vol. 39, pp. 2166-2171, (Jun. 1979).

Miller, Douglas L., "Effects of a High-Amplitude 1-MHz Standing Ultrasonic Field on the Algae Hydrodictyon," IEEE Transaction on Ultrasonics, Ferroelectrics, and Frequency Control, vol. UFFC-33. No. 2, pp. 165-170, Mar. (1986).

Miller, et al., "Single strand DNA breaks in human leukocytes inducted by ultrasound in vitro," Ultrasound in Med. & Biol., vol. 15, No. 8, pp. 765-771, (1989).

Nyborg, W. L. and Ziskin, M. C. (Eds.), *Biological Effects of Ultrasound*, Churchill-Livingstone Inc., New York, pp. 23-33, (1985).

Pétrier et al., "Sonochemical Degradation of Phenol in Dilute Aqueous Solutions: Comparison of the Reaction Rates at 20 and 487 kHz," J. Phys. Chem. vol. 98, No. 41, pp. 10514-10520 (1994).

Phull S. S. et al., "The Development and Evaluation of Ultrasound in the Biocidal Treatment of Water," Ultrasonics Sonochemistry, vol. 4, No. 2, pp. 157-164, Apr. 1997.

Wyllie, et al., "Apoptosis and the regulation of cell numbers in normal and neoplastic tissues: an overview," Cancer and Metastasis Reviews, vol. 11, pp. 95-103, (1992).

Umemura et al., "Sonodynamic treatment by inducing microbubble reaction," J.E.M.U. vol. 19, No. 2/3, pp. 266-270 (1998).

Umemura, et al., "Mechanism of Cell Damage by Ultrasound in Combination with Hematoporphyrin," Jpn. J. Cancer Res., vol. 81, pp. 962-966, (Sep. 1990).

Vollmer, et al., "Bacterial stress responses to 1-Megahertz pulsed ultrasound in the presence of microbubbles," Applied and Environmental Microbiology, pp. 3927-3931, (Oct. 1998).

Yu et al., "A review of research into the uses of low level ultrasound in cancer therapy," Ultrasonics Sonochemistry, vol. 11, pp. 95-103 (2004).

European Search Report for PCT/US2004/021664 Dated Jan. 9, 2006.

* cited by examiner

DEVICE AND PROCESS FOR TREATING CUTTING FLUIDS USING ULTRASOUND

RELATED APPLICATIONS

This application is a continuation of U.S. application Ser. No. 10/734,103, filed Dec. 10, 2003, now U.S. Pat. No. 7,048,863 which claims priority under 35 U.S.C § 119(e) to U.S. Provisional Application No. 60/485,888, filed Jul. 8, 2003.

FIELD

The present invention is directed to using high-frequency, low-energy ultrasound to treat cutting fluid.

BACKGROUND

The cutting of metals and other hard materials is often carried out with the use of a cutting tool to provide a desired shape, size or surface to the workpiece. When cutting these hard materials, frictional heat can burn the cutting tool and make the machined surface of the workpiece rough. Furthermore, thermal expansion lowers the accuracy of the shape and the size of the workpiece and the tool, thereby causing various other problems. To help alleviate the above problems, a cutting fluid is often employed during cutting.

Oils are commonly used as a cutting fluid when cutting metals and other hard materials. One disadvantage of using a straight oil as a cutting fluid is that it usually has to be used at low temperatures because high temperatures can cause the production of fire and smoke. To help overcome this problem, an oil-water emulsion cutting fluid having sufficient lubricity and cooling properties, can be used as a cutting fluid.

Unfortunately, cutting fluids, especially water-based cutting fluids, are susceptible to bacteria and other microbial propagation. Bacterial colonies often result in unpleasant odors, deterioration of the cutting fluid, and serious health hazards. In general, there are two types of bacteria that grow in cutting fluids: aerobic, which multiply in the presence of oxygen, and anaerobic, which propagate in the absence of oxygen. While the anaerobic types can result in unpleasant odors through the production of hydrogen sulfide, they typically do very little actual damage to cutting fluid itself. However, the aerobic type seriously degrades fluids, causing corrosion inhibition and loss of lubricity. Furthermore, the bacterial lifecycle while "eating" the fluid concentrate also results in the deposition of various acids and salts. This can cause extensive rusting/corrosion of both moving machine parts and the material being machined.

To prevent these accompanying problems, biocides have been added to cutting fluids. In practice however, these agents are of limited usefulness. In addition to costing more money, there are limits on the amount of biocide which can be incorporated into the cutting fluid. Furthermore, these agents are often ineffective, degrade over time, and replacing them can be expensive. In addition, these agents and substances often lower the quality of cutting fluid.

Accordingly, there is a need in the art for an effective and new method of treating cutting fluids, that can provide uniform protection, or substantially uniform protection with time, without the use of large amounts of biocides.

DETAILED DESCRIPTION

The teachings herein are directed towards devices and methods which can neutralize, prevent the growth of, and remove microorganisms present in a cutting fluid. In further embodiments, the devices and methods provided herein can treat cutting fluids suspected of containing microorganisms, for example.

Cutting fluid degrades with time, based in part to microbial (e.g., bacterial) growth and contamination from the machining operation. When it becomes uneconomical to maintain the cutting fluid by regular make-up operations, the cutting fluid is typically disposed of. Accordingly, the embodiments herein encompass extending the useful life of cutting fluid by preventing degradation caused by microbes. In further embodiments, where the cutting fluid has degraded to a point where its utility has expired, the methods herein can be used to bring the cutting fluid to a safe level (neutralizing microbial propagation) prior to disposal (e.g., releasing the cutting fluid flow into a sewer system).

Devices and Methods

Figure 1:
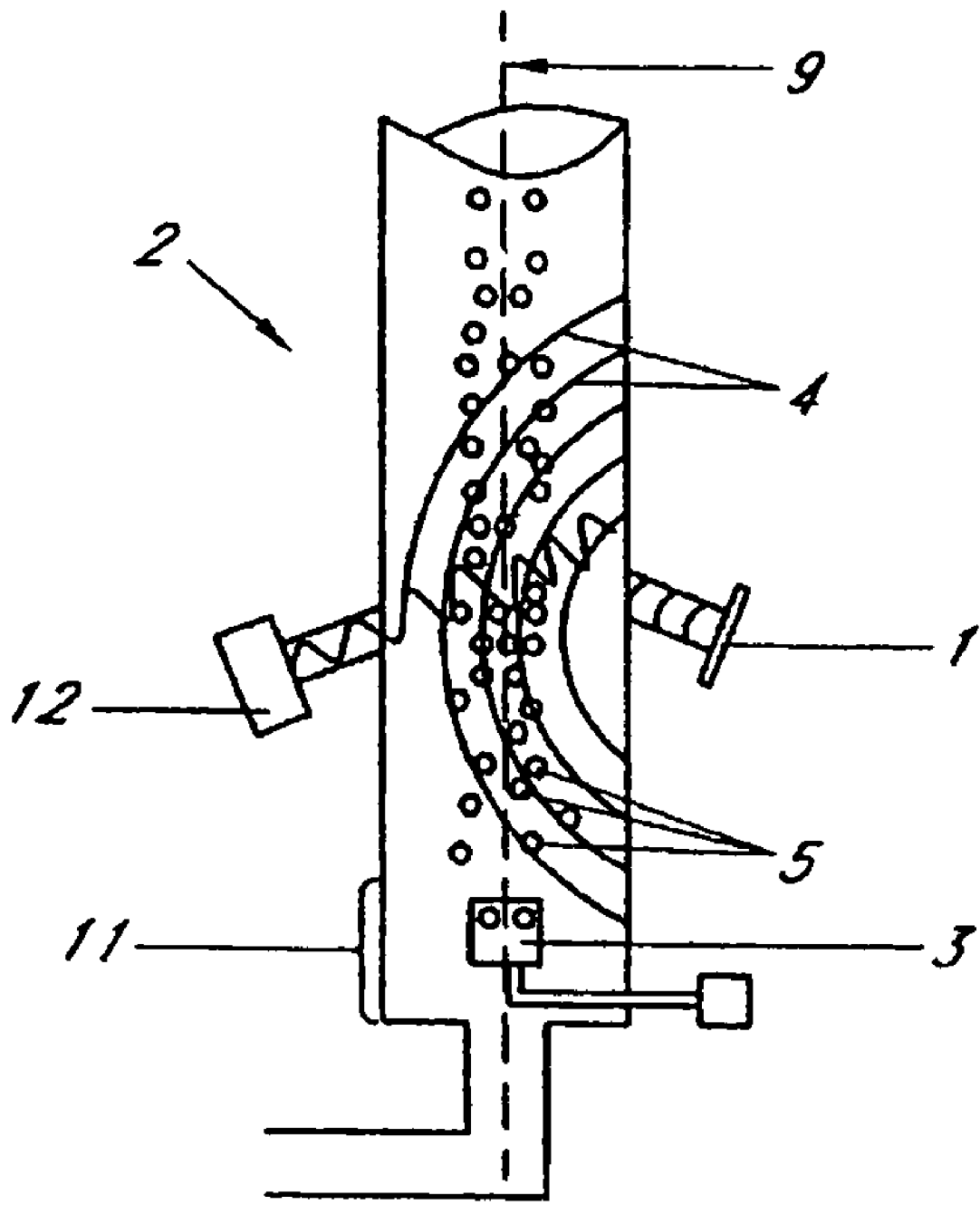
FIG. 1 is a drawing showing one embodiment of an ultrasound/microbubble device described herein.

Embodiments of the devices described herein can be found in U.S. application Ser. No. 10/358445 and U.S. Pat. No. 6,540,922 to Cordemans et al., both of which are expressly incorporated herein by reference in their entireties. Methods of treating cutting fluids can be performed with the devices disclosed herein. One particular embodiment of a device that can be used for treating cutting fluid is represented in FIG. 1. In certain embodiments, the cutting fluid to be treated can contain microorganisms, including bacteria, viruses, fungi, protists, and the like, for example.

Referring to FIG. 1, the devices described herein can include a compartment 2, preferably in the shape of a cylinder or a rectangular cross-section. In further embodiments the compartment 2 can be in communication with a reservoir (not shown) which holds the cutting fluid to be treated. The term "reservoir" is to be construed broadly, and generally relates to an apparatus containing cutting fluid. In specific embodiments the devices provided herein are connected (e.g., via a side stream) through the sump to the recirculating cutting fluid. In further embodiments, the devices provided herein are not in communication with a reservoir and are directly connected to the cutting fluid to be treated.

In further embodiments, the compartment 2 contains (e.g., along its wall) one or more high-frequency ultrasound emitters 1 that emit ultrasound 4 into the compartment 2 (preferably into the center of this compartment 2). In other embodiments the container can also have one or more microbubble emitters 3 for emitting gas microbubbles 5, which are arranged so as to emit the gas microbubbles 5 into the ultrasound 4 field emitted in the compartment 2.

The term "microbubbles," as used herein is intended to refer to gas bubbles with an average diameter of less than 1 mm. In some embodiments the diameter is less than or equal to 50 µm. Still in other embodiments the microbubbles have a diameter less than about 30 µm. In certain embodiments the microbubbles are selected from air, oxygen, and ozone microbubbles. To lower operating costs, it can be advantageous to use microbubbles that are not ozone microbubbles, such as air microbubbles.

The term "microorganisms" is synonymous with microbes and generally relates to pathogenic or non-pathogenic microorganisms which can give rise to harmful effects to cutting instruments (e.g., machinery, tools, etc.), man, mammals or any other animal. Such microorganisms can include both aerobic and anaerobic bacteria (e.g., *Yersenia, Staphylococcus, E. coli, Pseudomonas aeruginosa, Pseudomonas oleovorans, Paracolobactrum, Proteus vulgaris, Klebsiella pneumoniae, Micrococcus pyogenes, Aerobacter aerogenes, Citrobacter, Achromobacter*), viruses (e.g., HIV, HCV, HBV), fungi (e.g., *Fusarium, Cephalosporium, Cladosporium, Aspergillus*), protists (e.g., mold, algae), and the like, for example.

In specific embodiments, the methods and devices herein include low energy, high-frequency ultrasound to treat a cutting fluid. The term "high frequency" is intended to refer to frequencies higher than 200 kHz and up to several MHz. In certain embodiments, the high frequencies used are between 200 kHz and 10 MHz. In still other aspects, the high-frequencies can be between 200 kHz and 20 MHz. In various other embodiments, the high-frequencies can be between 800 kHz (where less radical effects and more biological effects are reached) and 5 MHz. In another embodiment, the frequency used is between 1 MHz and 3 MHz. More specifically, the frequency can be about 1.8 MHz.

In various embodiments of the methods and devices described herein, the microbubble emitter 3 for emitting gas microbubbles 5 is arranged at the base 11 of the compartment 2, (i.e., at the bottom of the compartment 2), such that the microbubbles move by rising naturally or by entrainment of the gas in the flow of the cutting fluid.

In still further embodiments, the devices and methods provided herein, neutralize, treat or prevent the growth of microorganisms in a cutting fluid. Although the present teachings are in no way to be limited by their precise mechanism of action, in more specific embodiments the devices provided herein can produce radicals such as H', 'OH and HOO'. These radicals can also form $H_2O_2$, which along with the radicals, is toxic to microorganisms and can bring about their inactivation and/or destruction.

The species created are thought to be derived from the reactions of high-frequency ultrasound on the water molecule, most likely giving rise (in particular in the presence of oxygen) to the following reactions:

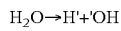

$H_2O \rightarrow H' + 'OH$

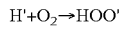

$H' + O_2 \rightarrow HOO'$

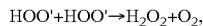

$HOO' + HOO' \rightarrow H_2O_2 + O_2$,

$'OH + 'OH \rightarrow H_2O_2$

Advantageously, the energy required to produce these toxic species is reduced if the process is performed in the presence of microbubbles, as described herein.

It has been recently appreciated that the injection of microbubbles into the ultrasound field gives rise to an increase in the phenomenon of sonoluminescence, by superposition of the microbubbles onto the cavitation bubbles induced by the ultrasound, the number of excited and toxic species can be multiplied. This phenomenon is observed on a macroscopic level when the ultrasound treatment is synergistically combined with the presence of microbubbles of suitable size.

In additional embodiments, the devices and methods provided herein have the advantage that there is no need to devote the ultrasound to specific zones, since it is observed that the treatment system functions by diffusing the products formed in situ (for example, ROS (reactive oxygen species), radicals and $H_2O_2$ formed) towards the reservoir of the cutting fluid to be treated.

In further embodiments, the one or more ultrasound emitters 1 in the devices described herein are oriented so as not to give rise to practically any standing-wave phenomena. For example, in certain embodiments, one or more ultrasound emitters I can be oriented obliquely relative to the axis 9 of the compartment 2 (acute angle not perpendicular to this axis 9) and relative to the flow of cutting fluid and to the flow of microbubbles 5 (see FIG. 1) This characteristic makes it possible for all the microbubbles 5 in the compartment 2 to be treated in a statistically identical manner, without creating stationary zones in the said compartment 2. Accordingly, certain embodiments herein are directed to devices and methods that provide uniform treatment, or substantially uniform treatment, and protection over time.

According to other embodiments, the devices and methods described herein can include a light emitter 12 (i.e. an electromagnetic radiation emitter) which emits into the compartment 2 in the ultrasound 4 field, radiation, with a frequency that is mostly in the visible range. However, for certain applications, in order to remove certain specific microorganisms, it can be advantageous to emit electromagnetic radiation with a frequency that is mostly non-visible, as ultraviolet radiation (e.g., UVA, UVB or UVC type), infrared, laser, microwaves, and the like, for example.

It has recently been discovered, unexpectedly, that a treatment comprising the emission of microbubbles into the fields combined with ultrasound and light radiation is particularly effective at inactivating and removing microorganisms present in a cutting fluid, and preventing their growth. The phenomenon of sonoluminescence can promote the production of extremely active oxygenated species (often referenced as ROS (reactive oxygen species) such as the superoxide radical, OH, or singlet oxygen, which can result in a series of biochemical reactions that are extremely toxic for certain microorganisms.

In various embodiments, the teachings herein are directed towards devices which do not require additional chemical products (e.g., biocides, photosensitizers) to neutralize or prevent the growth of microorganisms from a cutting fluid. In other embodiments the methods and devices herein can be used in conjunction with additional chemical agents.

In other embodiments, the devices and methods described herein can include a pump or other devices for recirculating the cutting fluid, as well as devices for recovering the microorganisms present in the cutting fluid. Examples of devices for recovering the microorganisms, non-exclusively include apparatuses for filtration, centrifugation, and precipitation (such as cyclones, and the like). In certain embodiments, the pump and/or devices for recovery are arranged between the reservoir containing the cutting fluid, to be treated and the compartment 2.

Figure 2:
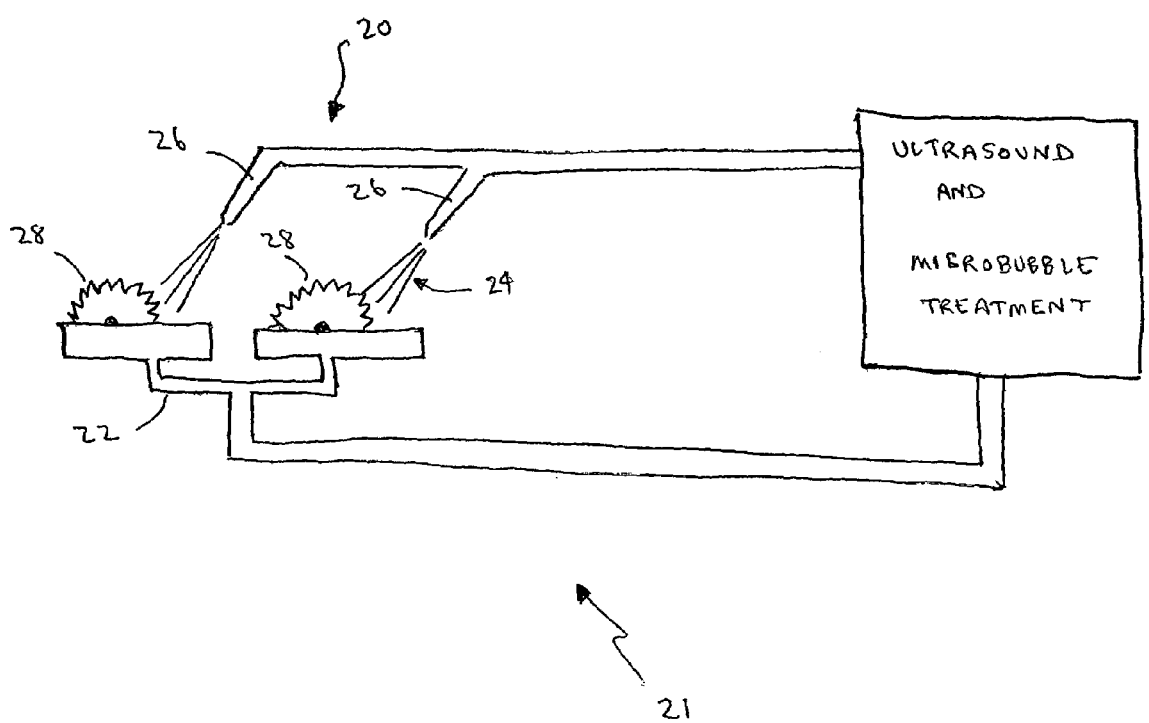
FIG. 2 is a drawing showing a recirculating cutting fluid system comprising a ultrasound/microbubble device connected to a cutting fluid distributor and a cutting fluid collection device.

In certain embodiments, the devices provided herein can be connected to a cutting fluid distributor and/or cutting fluid collection system (e.g., a trench or sump). For example, FIG. 2 represents a recirculating cutting fluid system 21 comprising a ultrasound/microbubble treatment device connected to a cutting fluid distributor 20 and a cutting fluid collection device 22. In further embodiments, the cutting fluid to be treated may be applied either manually to the cutting zone 24 of the tool, or delivered in a mist. In specific embodiments, the cutting fluid is distributed in a continuous stream, delivered by a pump and directed through a nozzle 26 to the cutting edge 28 of the machine tool or through the tool and over the work to carry away the work material chips or swarf. In other embodiments, a variety of fluid nozzle designs can be used depending on the specific application needed. In still further embodiments, a distribution system 20 can be used to control the cutting fluid flow volume and flow pressure. In other embodiments, the cutting fluid can be in a recirculating system 21. Non-exclusive examples of cutting fluid distributors that can be used with the devices herein are disclosed in U.S. Pat. No. 6,450,738, to Ripley, and U.S. Pat. No. 4,514,149, to Kanebako et al., both of which are hereby expressly incorporated by reference in their entireties.

In further embodiments, the cutting fluid can be collected through gravity flow, velocity flow, or trenches (e.g., conveyorized trenches). In specific embodiments, after the cutting fluid is collected, it can be treated according to the methods provided herein and recirculated to the cutting zone of the machine tool. In other embodiments, the cutting fluid is not collected, and travels directly from the cutting zone to the devices provided herein, for treatment. A non-exclusive example of a cutting fluid collection system that can be used with the devices and methods herein is disclosed in U.S. Pat. No. 5,593,596, to Bratten, which is hereby expressly incorporated by reference in its entirety. In still further aspects, the devices and methods herein can be used with any suitable cutting fluid monitoring and/or control system, such as those disclosed in U.S. Pat. No. 5,224,051, to Johnson, for example, which is hereby expressly incorporated by reference in its entirety.

The methods and devices herein can be used to treat practically any type of cutting fluid used with any suitable instrument (e.g., machine) capable of cutting or manipulating hard materials, such as metals, and the like, for example. The term "cutting" is to be construed broadly, and encompasses all types of hard material (e.g., metal) manipulations. In certain embodiments, the term "cutting" can relate to planing, boring, broaching, counter-boring, forming, threading, shaping, hole extruding, milling, sawing, drilling, spot facing, tapping, hobbing, drawing, engraving, piercing, internal breaching, reaming, punching (e.g., using a punch press), roll forming, seat forming, stamping, turning, diamond wafering, and the like, for example. Accordingly, the methods and devices herein can be used with any suitable instrument or machine that is capable of the above listed functions, or like functions. For example, suitable instruments and machines include: milling cutters, broaching machines, boring machines, counter-boring machines, forming machines, boring mills, saws (e.g., circular and band), grinders (e.g., belt and wheel), drilling machines, punch presses, and the like.

In certain embodiments, the methods and devices provided herein can treat each cutting fluid used by a particular cutting instrument, regardless of whether the cutting instrument is using one or more types of cutting fluids, or is connected to one or more cutting fluids reservoirs.

The methods and devices herein can be used to treat any suitable type of cutting fluid currently available or that will be available in the future. The term "cutting fluid" is to be construed broadly and generally relates to fluids used as a lubricant, cooling agent, anti-welding agent, or corrosion inhibitor in cutting hard materials, such as metal, and the like, for example. In certain embodiments the term "cutting fluid" encompasses metal working fluid (MWF). In other embodiments, the term "cutting fluid" encompasses fluid used to treat, manipulate or cut other hard materials, such as: glass, ceramics, carbides, minerals, earthenware, diamonds and other precious stones, plastics, and the like, for example.

Based on the above-mentioned functions, cutting fluids can lead to longer tool life, reduced thermal deformation of workpiece, a better surface finish, and ease of chip and swarf handling, and the like, for example.

Practically any cutting fluid, including any of the following four general categories of cutting fluids, can be used with the devices and methods described herein: soluble-oils, semisynthetic fluids, and synthetic fluids.

In other embodiments, the methods and devices herein can be used to treat synthetic cutting fluids. Synthetic fluids generally contain no petroleum or mineral oil base and instead are formulated from alkaline inorganic and organic compounds. Synthetic cutting fluids can include synthesized hydrocarbons, organic esters, polyglycols, phosphate esters, organic or inorganic salts, and other synthetic lubricating fluids. In addition, synthetic cutting fluids can include additives, such as agents that inhibit corrosion. Synthetic fluids are often used in a diluted form. For example, each part of synthetic concentrate can be diluted with about 9-41, 10-40, 11-40, 11-39, 10-35, and 10-30 parts water. Synthetic fluids often provide the best cooling performance among all cutting fluids, but generally do not provide optimal lubrication.

In still further embodiments, the methods and devices herein can be used to treat soluble-oil cutting fluids. Although used throughout the industry, the term "soluble-oil," is typically a misnomer because the constituents are generally not soluble in water. Soluble-oils are generally oils (e.g., mineral and petroleum) blended with emulsifiers and/or other additives which, when added to water and stirred, form an oil-in-water emulsion. The emulsion allows the good cooling properties of water to be utilized in the metal working process while the oil and any other additives can provide lubrication and corrosion inhibiting properties, for example. Usually, the concentrate includes a base mineral oil and one or more emulsifiers to help produce a stable emulsion. Superfatted emulsions are typically produced by the addition of fatty oils, fatty acids, or esters. Extreme pressure emulsions can include additives such as chlorine, chlorinated paraffins, sulfur, phosphorus, and the like, for example.

Typically, soluble-oil cutting fluids provide good lubrication and heat transfer performance. Furthermore, soluble-oil cutting fluids are widely used in industry and are usually the least expensive among all cutting fluids. Soluble-oil cutting fluids are also known as water-based oils, water-based soluble oils, water-based emulsifying oils, emulsifying oils, and the like.

Oils are typically diluted in soluble-oil cutting fluids. For example, in certain embodiments, the oil can constitute about 3%, 4%, 5%, 6%, 7%, 8%, 9%, or 10% of the cutting fluid. In certain embodiments, the water used in soluble-oil cutting fluids is deionized or softened. In other embodiments, the water used can include about 70-140, 80-125, or 90-115 ppm of calcium carbonate.

In other embodiments, the methods and devices herein can be used to treat semi-synthetic cutting fluids. Semi-synthetic cutting fluids generally relate to a combination of synthetic and soluble-oil fluids and have characteristics common to both types. The cost and heat transfer performance of semi-synthetic fluids typically lie between those of synthetic and soluble-oil fluids.

Depending on the specific type of cutting fluid to be treated with the method herein, the cutting fluid can contain water, oil, and one or more emulsifiers, chelating agents, coupling agents, viscosity index improvers, detergents, plasticizers, anti-mist agents, anti-weld agents, oiliness agents, surfactant wetting agents, dispersants, passivators, anti-foaming agents, alkaline reserves, dyes, odorants, corrosion inhibitors, extreme pressur additives, lubricity enhancers, cleaners, tapping compounds, fingerprint neutralizers, or any other suitable additive, for example.

In some embodiments, the devices and methods provided herein can be used in conjunction with anti-microbial agents such as a amine, amide, phenyl, guanidine, prochloraz, propiconazole, iodocarb, sodium hypobromite, 5-Chloro-2-methyl 4-isothiazolin-3-one, 2-methyl-4-isothiazolin-3-one, 3-Isothiazolone (which can be stabilized with antimony salts), Tris(hydroxymethyl)nitromethane, Hexahydro-1,3,5-tris(2-hydroxyethyl-S-triazine, Hexahydro-1,3,5-triethyl-S-triazine, 1-(3-Chloroallyl)-3,5,7triaza-1-azonia adamantane chloride, 4-(2-Nitrobutyl)morpholine-4,4'-(2-ethyl-2-nitrotrimethylene) dimorpholine, O-Phenyl phenol, Sodium 2-pyridinethiol-1-oxide, 1,2-BIT, 6-Acetoxy-2,4-dimethyl-m-dioxane, 2,2-Dibromo-3-nitrilopropionamide, p-Chloro-m-xylenol, and the like. Non-exclusive examples of microbiocides are also provided in U.S. Pat. No. 6,342,522, to Mason et al., U.S. Pat. No. 6,322,749, to McCarthy et al., U.S. Pat. No. 5,416,210, to Sherba et al., U.S. Pat. Nos. 4,975,109 and 5,256,182, to Friedman, Jr. et al., U.S. Pat. No. 5,145,981, to Willingham, U.S. Pat. No. 4,294,853, to Williams et al., all of which are expressly incorporated by reference in their entireties.

While in some embodiments the methods and devices herein can be used with microbiocides, such as those described above, it is important to note that the effectiveness of the provided methods and devices in treating, preventing the growth of or neutralizing microorganisms is not dependent on additional chemicals (e.g., biocides). Accordingly, the methods and devices described herein can be used without anti-microbial agents.

Examples of cutting fluids that the methods and devices herein can treat, include, but not limited to the cutting fluids disclosed in U.S. Pat. Nos. 6,518,225 and 6,242,391, to Fukutani et al., U.S. Pat. No. 5,534,172, to Perry et al., U.S. Pat. No. 6,221,814, to Kaburagi et al., U.S. Pat. No. 4,605,507, to Windgassen et al., U.S. Pat. No. 6,258,759, to Futahashi, et al., and U.S. Pat. No. 5,616,544, to Kalota, et al., all of which are expressly incorporated herein by reference in their entireties.

Cutting fluids can be used in cutting or manipulating any suitable hard material. In certain embodiments, the cutting fluid to be treated by the methods herein can be used (e.g., as a coolant or lubricant) in the cutting of any suitable type of metal workpiece. In specific embodiments the workpiece can be or include: carbon, alloy and tool steel, stainless steel, titanium and other high-temperature alloys, grey and ductile cast irons, aluminum and aluminum alloys, non-ferrous materials, magnesium, copper and copper alloy, bronze, brass, carbon steels, stainless steels, chrome-moly steels, vanadium, titanium, nitalloy, inconel, monel, berylium copper, boron carbide, and the like, for example.

In other embodiments the cutting fluid to be treated by the methods and devices described herein can be used in the cutting and manipulation of hard materials, besides metals, including, but not limited to: glass, ceramics, carbides, minerals, earthenware, diamonds and other precious stones, plastics, and the like, for example.

In further embodiments, the devices and methods herein can be used in conjunction with one or more other methods that prevent microbial propagation including: centrifuging, filtering, aerating, cleaning the sump, maintaining proper concentration of cutting fluid, removing surface tramp oil, and adding biocides, for example. Accordingly, in certain embodiments, the devices and methods herein relate to applying high-frequency ultrasound either before, after, or during one or more the above-mentioned treatment methods, or other anti-microbial treatments.

While the foregoing description details certain embodiments of the teachings herein, it will be appreciated, however, that no matter how detailed the foregoing appears in text, the devices and methods herein can be practiced in many ways. As is also stated above, it should be noted that the use of particular terminology when describing certain features or aspects of the teachings herein should not be taken to imply that the terminology is being re-defined herein to be restricted to including any specific characteristics of the features or aspects of the teachings herein with which that terminology is associated. The scope of the teachings herein should therefore be construed in accordance with the appended claims and any equivalents thereof.

What is claimed is:

1. An apparatus for reducing the presence of live microorganisms in a cutting fluid comprising:
   a compartment for holding a reservoir of cutting fluid;
   an ultrasound emitter configured to emit ultrasound signals at a frequency higher than 200 kHz into said compartment; and
   a gas bubble emitter configured to emit gas bubbles into the ultrasound field in the compartment containing the cutting fluid.

2. The apparatus according to claim 1, wherein the gas bubbles are not ozone bubbles.

3. The apparatus according to claim 1, wherein the gas bubbles are selected from the group consisting of air and oxygen bubbles.

4. The apparatus according to claim 1, wherein the cutting fluid is a water-soluble cutting fluid.

5. The apparatus according to claim 1, wherein the cutting fluid is a synthetic cutting fluid.

6. The apparatus according to claim 1, wherein the cutting fluid is a semi-synthetic cutting fluid.

7. The apparatus according to claim 1, wherein the apparatus is configured such that the ultrasound emitted into the compartment does not generate a stationary field phenomenon.

8. The apparatus according to claim 1, further comprising an electromagnetic radiation emitter configured to emit electromagnetic radiation in the visible range into the ultrasound field.

9. The apparatus according to claim 1, wherein the apparatus reduces the presence of bacteria in the cutting fluid.

10. A method of treating cutting fluid comprising:
    collecting cutting fluid from a fluid routing circuit;
    routing said cutting fluid into a compartment;
    simultaneously exposing said cutting fluid in the compartment to gas bubbles and ultrasound of a frequency of 100 kHz or higher, wherein the simultaneous exposure to the gas bubbles and the ultrasound brings about the inactivation of microorganisms present in the cutting fluid.

11. The method of claim 10, wherein said gas bubbles consist essentially of ambient air.

12. The method of claim 10, wherein the cutting fluid is treated without exposure to ultraviolet radiation.

13. The method of claim 10, wherein exposure of the cutting fluid to the ultrasound signals in the presence of the gas bubbles brings about the inactivation of aerobic bacteria present in the cutting fluid.

14. A machining system comprising:
    a cutting device;
    a cutting fluid circuit connected to the cutting device;

a compartment for holding a reservoir of cutting fluid through which said cutting fluid is routed;

an ultrasound emitter configured to emit ultrasound signals at a frequency higher than 100 kHz into said compartment; and a gas bubble emitter configured to emit gas bubbles into the ultrasound field in the compartment containing the cutting fluid, wherein exposure of the cutting fluid to the ultrasound signals in the presence of the gas bubbles brings about the inactivation of microorganisms present in the cutting fluid.

15. The apparatus according to claim 14, wherein the gas bubbles are not ozone bubbles.

16. The apparatus according to claim 14, wherein the gas bubbles are selected from the group consisting of air and oxygen bubbles.

17. The apparatus according to claim 14, wherein the cutting fluid is a water-soluble cutting fluid.

18. The apparatus according to claim 14, wherein the cutting fluid is a synthetic cutting fluid.

19. The apparatus according to claim 14, wherein the cutting fluid is a semi-synthetic cutting fluid.

20. The apparatus according to claim 14, wherein the apparatus is configured such that the ultrasound emitted into the compartment does not generate a stationary field phenomenon.

21. The apparatus according to claim 14, further comprising an electromagnetic radiation emitter configured to emit electromagnetic radiation in the visible range into the ultrasound field.

22. The machining system of claim 14, wherein exposure of the cutting fluid to the ultrasound signals in the presence of the gas bubbles brings about the inactivation of aerobic bacteria present in the cutting fluid.

* * * * *

UNITED STATES PATENT AND TRADEMARK OFFICE
CERTIFICATE OF CORRECTION

PATENT NO. : 7,404,906 B2
APPLICATION NO. : 11/371819
DATED : July 29, 2008
INVENTOR(S) : Swinnen et al.

It is certified that error appears in the above-identified patent and that said Letters Patent is hereby corrected as shown below:

Title page, Col. 2 (Other Publications), line 1, Delete "Böm" and insert -- Böhm --, therefor.
Col. 1, line 58, (Approx.), After "of" insert -- the --.
Col. 4, line 9, Delete "I" and insert -- 1 --, therefor.
Col. 4, line 37, Delete "OH," and insert -- 'OH, --, therefor.
Col. 6, line 62, Delete "method" and insert -- methods --, therefor.
Col. 7, line 1, Delete "pressur" and insert -- pressure --, therefor.
Col. 7, line 11, Delete "(2-hydroxyethyl-" and insert -- (2-hydroxyethyl)- --, therefor.
Col. 7, line 12, Delete "7triaza-" and insert -- 7-triaza- --, therefor.

Signed and Sealed this

Twenty-eighth Day of April, 2009

JOHN DOLL
*Acting Director of the United States Patent and Trademark Office*